UNITED STATES PATENT OFFICE.

FRANCIS STABLER, OF BALTIMORE COUNTY, MARYLAND.

IMPROVED PROCESS FOR PRESERVING ANIMAL AND VEGETABLE SUBSTANCES.

Specification forming part of Letters Patent No. 50,965, dated November 14, 1865; Reissue No. 2,162, dated January 30, 1866.

*To all whom it may concern:*

Be it known that I, FRANCIS STABLER, of Baltimore county, in the State of Maryland, have invented a new and useful Process of Preserving Animal or Vegetable Substances Suitable for Food; and I hereby declare that the following is a full and exact description thereof.

The nature of my invention consists in depriving animal or vegetable substances of water to such an extent that when they are sealed up in an atmosphere of carbonic-acid gas, or other gas incapable of supporting combustion in air-tight vessels, they will be preserved for use. The presence of oxygen in water and in atmospheric air requires the article to be preserved to be dried, so far as may be necessary, practically to get rid of water whose oxygen might promote decomposition, while carbonic-acid gas or other gas which will not support combustion or promote decomposition is substituted for atmospheric air.

To illustrate the application of my invention: If oysters, for example, are to be preserved, I cover a suitable surface with a layer of dry salt on which I place a layer of oysters, and cover it with another layer of dry salt, then a layer of oysters, and then again a layer of dry salt, alternating the oysters and salt according to circumstances. As it is well known that salt absorbs moisture, the oysters will be found, after being thus embedded in it for from two to four hours, to be sufficiently dry for preservation according to my process. I then place the oysters, with what salt adheres to them as they are removed, in the vessel they are to be packed in, and introduce into this, through a pipe extending to the bottom of it, a flow of carbonic-acid gas, or other gas that will not support combustion or promote decomposition, which, being heavier than atmospheric air, takes the place of it, and when the vessel is full will flow out at the opening, where its presence may be known by applying a lighted match or taper there, whose flame the gas will extinguish. The pipe is then withdrawn to be used in another vessel, and so on, and the lid is soldered down in the usual way and the vessel made air-tight.

There are many ways in which carbonic-acid gas, or other gas suitable to be used, can be obtained and applied. In my early practice I used for carbonic-acid gas a soda-fountain as the reservoir of the gas, and, by means of a flexible tube, found no difficulty in filling the vessel containing the oysters, as above described. To fill the soda-fountain with carbonic-acid gas, I introduced a pipe extending down to the bottom of it, through which the gas produced by mixing sulphuric acid with marble-dust was introduced, and around which pipe, through the orifice of the fountain, the atmospheric air made its exit as the heavier gas took its place till the fountain was filled.

In the preservation of fruits I have used dry sugar in place of salt, preserving otherwise the same process. When preserving peaches, I take out the stone, after pealing the fruit, so as to allow the sugar to act freely on the water which the peach contains, and which the sugar absorbs as far as is practically necessary.

I have referred to oysters and peaches; but my invention may be applied to any animal or vegetable substances without other variations of detail than would suggest themselves to persons familiar with packing such substances for food. I have referred, also, to salt and sugar as agents used by me for drying the article to be preserved, but provided the same degree of dryness is produced in any other way the same result will be obtained, it being the abstraction of the water and the oxygen it contains, and not the agent in the abstraction, to which the result is due. The same remark may be made in regard to the way in which I have obtained and introduced the carbonic-acid gas. Many other ways may be resorted to, the only essential point being the substitution, in some way or other, of a gas that will not support combustion or promote decomposition in place of atmospheric air.

What I claim as my invention or process, and desire to secure by Letters Patent, is—

Preserving animal or vegetable substances used for food, when wholly or partially desiccated, as above described, by sealing them in air-tight vessels from which the atmospheric air has been expelled by the introduction of carbonic-acid gas or other gas that will not support combustion, substantially as described.

Witnesses: FRANCIS STABLER.

JNO. W. B. LATROBE,

FERDINAND C. LATROBE.